US012437737B2

(12) United States Patent
Maezawa

(10) Patent No.: US 12,437,737 B2
(45) Date of Patent: Oct. 7, 2025

(54) PERFORMANCE ANALYSIS METHOD AND PERFORMANCE ANALYSIS DEVICE

(71) Applicant: Yamaha Corporation, Shizuoka (JP)

(72) Inventor: Akira Maezawa, Shizuoka (JP)

(73) Assignee: Yamaha Corporation, Shizuoka (JP)

( * ) Notice: Subject to any disclaimer, the term of this patent is extended or adjusted under 35 U.S.C. 154(b) by 814 days.

(21) Appl. No.: 17/720,630

(22) Filed: Apr. 14, 2022

(65) Prior Publication Data

US 2022/0238089 A1 Jul. 28, 2022

Related U.S. Application Data

(63) Continuation of application No. PCT/JP2019/040813, filed on Oct. 17, 2019.

(51) Int. Cl.
*G10H 1/053* (2006.01)
*G10H 1/00* (2006.01)
*G10H 1/34* (2006.01)

(52) U.S. Cl.
CPC ........... *G10H 1/053* (2013.01); *G10H 1/0008* (2013.01); *G10H 1/348* (2013.01); *G10H 2210/066* (2013.01); *G10H 2210/091* (2013.01); *G10H 2210/265* (2013.01); *G10H 2220/265* (2013.01)

(58) Field of Classification Search
CPC ...... G10H 1/053; G10H 1/0008; G10H 1/348; G10H 2210/066; G10H 2210/091; G10H 2210/265; G10H 2220/265
USPC ........................................................... 84/609
See application file for complete search history.

(56) References Cited

U.S. PATENT DOCUMENTS

| | | | | |
|---|---|---|---|---|
| 6,639,141 B2 * | 10/2003 | Kay | G10H 1/40 84/609 |
| 8,290,769 B2 * | 10/2012 | Taub | G10L 25/90 84/649 |
| 2008/0267419 A1 * | 10/2008 | DeBoer | G10H 3/186 706/15 |
| 2009/0022331 A1 * | 1/2009 | DeBoer | G10H 1/0091 706/22 |

(Continued)

FOREIGN PATENT DOCUMENTS

| | | | | |
|---|---|---|---|---|
| CN | 104464717 A * | 3/2015 | G10L 13/06 |
| CN | 110634464 B * | 7/2023 | G10H 1/34 |

(Continued)

OTHER PUBLICATIONS

International Search Report in PCT/JP2019/040813, dated Dec. 24, 2019.

(Continued)

*Primary Examiner* — Christina M Schreiber
(74) *Attorney, Agent, or Firm* — Global IP Counselors LLP; David Tarnoff

(57) ABSTRACT

A performance analysis method is realized by a computer and includes acquiring a time series of input data representing played pitch that is played, inputting the acquired time series of input data into an estimation model that has learned a relationship between a plurality of items of training input data representing pitch and a plurality of items of training output data representing an acoustic effect to be added to sound having the pitch, and generating a time series of output data for controlling an acoustic effect to be added to sound having the played pitch represented by the acquired time series of input data.

20 Claims, 10 Drawing Sheets

(56) References Cited

U.S. PATENT DOCUMENTS

| | | | | |
|---|---|---|---|---|
| 2022/0238089 | A1* | 7/2022 | Maezawa ............. | G10H 1/0008 |
| 2022/0383842 | A1* | 12/2022 | Kaneko ................ | G10H 1/0025 |

FOREIGN PATENT DOCUMENTS

| | | | | | |
|---|---|---|---|---|---|
| JP | 2000029476 | A | * | 1/2000 | |
| JP | 2008284166 | A | * | 11/2008 | |
| JP | 2017102415 | A | * | 6/2017 | |
| JP | 6610715 | B1 | * | 11/2019 | ............... G10H 1/34 |
| WO | WO-2022172576 | A1 | * | 8/2022 | ........... G10L 13/033 |

OTHER PUBLICATIONS

Jeong, Dasaem, et al., "Score and Performance Features for Rendering Expressive Music Performances", Music Encoding Conference 2019, May 2019.

The first Office Action in the corresponding Chinese Patent Application No. 201980101398.9, dated Aug. 14, 2024.

Notice of Reasons for Refusal in the corresponding Japanese Patent Application No. 2021-552051, dated Jan. 24, 2023.

* cited by examiner

PERFORMANCE ANALYSIS METHOD AND PERFORMANCE ANALYSIS DEVICE

CROSS-REFERENCE TO RELATED APPLICATIONS

This application is a continuation application of International Application No. PCT/JP2019/040813, filed on Oct. 17, 2019. The entire disclosure of International Application No. PCT/JP2019/040813 is hereby incorporated herein by reference.

BACKGROUND

Field of the Invention

The present invention generally relates to technology for analyzing a performance.

Background Information

A configuration for adding various acoustic effects to the performance sound of a musical instrument, such as the sustained effect of using a sustain pedal of a keyboard instrument, has been proposed in the prior art. For example, Japanese Laid-Open Patent Application No. 2017-102415 discloses a configuration for using music data, which define the timing of a key operation and the timing of a pedal operation in a keyboard instrument, to automatically drive the pedal in parallel with the performance of a user.

SUMMARY

However, with the technology of Japanese Laid-Open Patent Application No. 2017-102415, it is necessary to prepare music data that define the timings of pedal operations in advance. Therefore, there is the problem that the pedal cannot be automatically driven when a musical piece for which music data are not prepared is played. In the description above, focus is placed on the sustained effect added by operating a pedal, but a similar problem can be assumed when various acoustic effects other than the sustained effect are added to a performance sound. Given the circumstances described above, an object of one aspect of the present disclosure is to appropriately add an acoustic effect to a pitch played by the user without requiring music data that define the acoustic effect.

In view of the state of the known technology, a performance analysis method according to one aspect of the present disclose comprises acquiring a time series of input data representing played pitch that is played, and inputting the acquired time series of input data to an estimation model that has learned a relationship between training input data representing pitch and training output data representing an acoustic effect to be added to a sound having the pitch, and generating a time series of output data for controlling acoustic effect to be added to sound having the played pitch represented by the acquired time series of input data.

A performance analysis device according to one aspect of the present disclosure comprises an electronic controller including at least one processor. The electronic controller is configured to execute a plurality of modules including an input data acquisition module and an output data generation module. The input data acquisition module acquires a time series of input data representing played pitch that is played. The output data generation module inputs the acquired time series of input data to an estimation model that has learned a relationship between training input data representing pitch and training output data representing an acoustic effect to be added to a sound having the pitch, and generates a time series of output data for controlling an acoustic effect to be added to sound having the played pitch represented by the acquired time series of input data.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

A: First Embodiment

Figure 1:
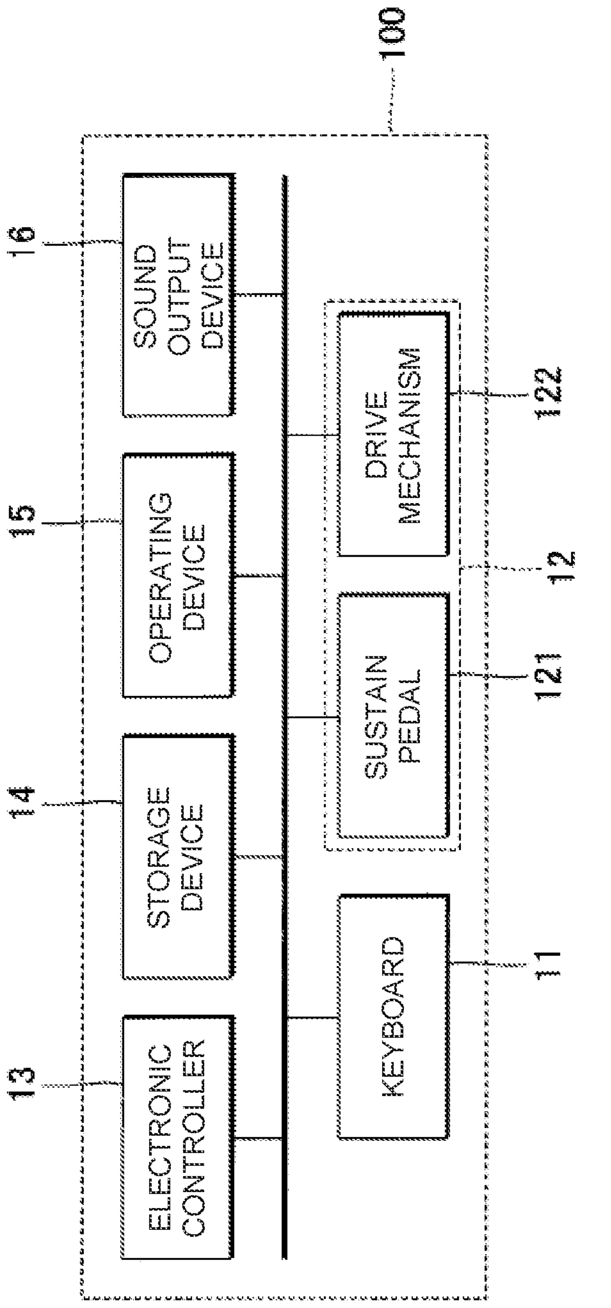
FIG. 1 is a block diagram illustrating a configuration of a performance system according to a first embodiment.

FIG. 1 is a block diagram illustrating the configuration of a performance system 100 according to the first embodiment. The performance system 100 is an electronic instrument (specifically, an electronic keyboard instrument) used by a user to play a desired musical piece. The performance system 100 includes a keyboard 11, a pedal mechanism 12, an electronic controller (control device) 13, a storage device 14, an operating device 15, and a sound output device 16. The performance system 100 can be realized as a single device, or as a plurality of devices which are separately configured.

The keyboard 11 is formed of an arrangement of a plurality of keys corresponding to different pitches. Each of the plurality of keys is an operator that receives a user operation. The user sequentially operates (presses or releases) each key in order to play a desired musical piece. Sound having a pitch that is sequentially specified by the user by an operation of the keyboard 11 is referred to as a "performance sound" in the following description.

The pedal mechanism 12 is a mechanism for assisting a performance using the keyboard 11. Specifically, the pedal mechanism 12 includes a sustain pedal 121 and a drive mechanism 122. The sustain pedal 121 is an operator operated by the user to issue an instruction to add a sustained effect to the performance sound. Specifically, the user depresses the sustain pedal 121 with his or her foot. The sustained effect is an acoustic effect that sustains the performance sound even after the given key is released. The drive mechanism 122 drives the sustain pedal 121. The drive mechanism 122 includes an actuator, such as a motor or a solenoid. As can be understood from the description above, the sustain pedal 121 of the first embodiment is operated by the user or by the drive mechanism 122. A configuration in which the pedal mechanism 12 can be attached to/detached from the performance system 100 can also be assumed.

The electronic controller 13 controls each element of the performance system 100. The term "electronic controller" as used herein refers to hardware that executes software programs. The electronic controller 13 includes one or a plurality of processors. For example, the electronic controller 13 includes one or a plurality of types of processors, such as a CPU (Central Processing Unit), an SPU (Sound Processing Unit), a DSP (Digital Signal Processor), an FPGA (Field Programmable Gate Array), an ASIC (Application Specific Integrated Circuit), and the like. Specifically, the electronic controller 13 generates an audio signal V corresponding to the operation of the keyboard 11 and the pedal mechanism 12.

The sound output device 16 emits the sound represented by the audio signal V generated by the electronic controller 13. The sound output device 16 is a speaker (loudspeaker) or headphones, for example. Illustrations of a D/A converter that converts the audio signal V from digital to analog and of an amplifier that amplifies the audio signal V have been omitted for the sake of convenience. The operating device 15 is an input device that receives operations from a user. The operating device 15 is a user operable input that includes a touch panel or a plurality of operators, for example. The term "user operable input" is a device that is manually operated by a person.

The storage device 14 includes one or more computer memories or memory units for storing a program that is executed by the electronic controller 13 and various data that are used by the electronic controller 13. The storage device 14 includes a known storage medium such as a magnetic storage medium or a semiconductor storage medium. The storage device 14 can be any computer storage device or any computer readable medium with the sole exception of a transitory, propagating signal. For example, the storage device 14 can be nonvolatile memory and volatile memory. The storage device 14 can be a combination of a plurality of types of storage media. A portable storage medium that can be attached to/detached from the performance system 100 or an external storage medium (for example, online storage) with which the performance system 100 can communicate can also be used as the storage device 14.

Figure 2:
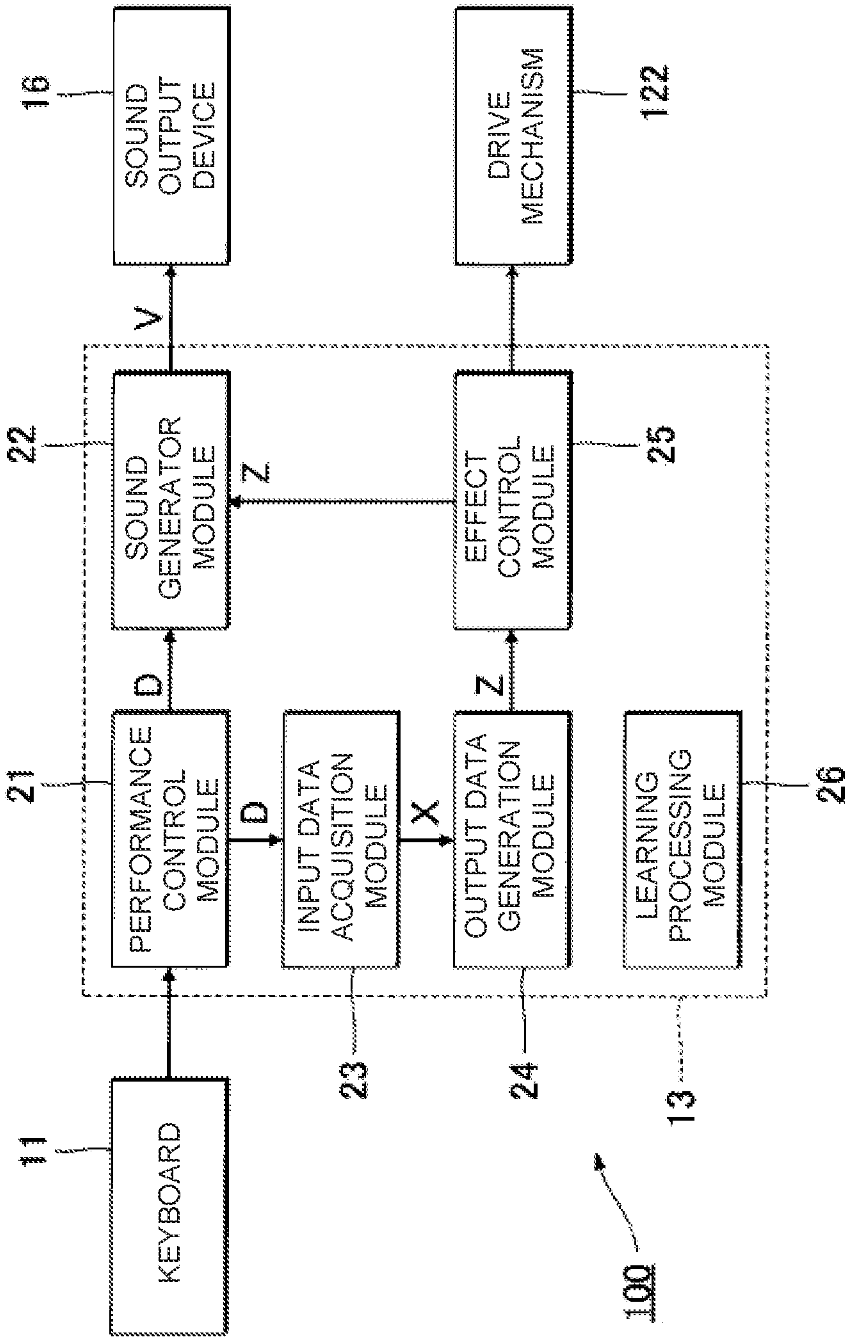
FIG. 2 is a block diagram illustrating a functional configuration of the performance system.

FIG. 2 is a block diagram illustrating a functional configuration of the electronic controller 13. The electronic controller 13 executes a program stored in the storage device 14 for realizing a plurality of functions for generating the audio signal V (a performance processing module 21, a sound generator module 22, an input data acquisition module 23, an output data generation module 24, an effect control module 25, and a learning processing module 26). In other words, the program is stored a non-transitory computer-readable medium, such as the storage device 14, and causes the electronic controller 13 to execute a performance analysis method or function as the performance processing module 21, the sound generator module 22, the input data acquisition module 23, the output data generation module 24, the effect control module 25, and the learning processing module 26. Some or all of the functions of the electronic controller 13 can be realized by an information terminal such as a smartphone.

The performance processing module 21 generates performance data D representing the content of the user's performance. The performance data D are time-series data representing a time series of pitches played by the user using the keyboard 11. For example, the performance data D are MIDI (Musical Instrument Digital Interface) data that specify the pitch and intensity of each note played by the user.

The sound generator module 22 generates the audio signal V corresponding to the performance data D. The audio signal V is a time signal representing the waveform of the performance sound corresponding to the time series of the pitch represented by the performance data D. Further, the sound generator module 22 controls the sustaining effect on the performance sound in accordance with the presence/absence of an operation of the sustain pedal 121. Specifically, the sound generator module 22 generates the audio signal V of the performance sound to which the sustaining effect is added when the sustain pedal 121 is operated and generates the audio signal V of the performance sound to which the sustained effect is not added when the sustain pedal 121 is released. The sound generator module 22 can be realized by an electronic circuit dedicated for the generation of the audio signal V.

The input data acquisition module 23 generates a time series of input data X from the performance data D. The input data X are date that represent the pitch played by the user. The input data X are sequentially generated for each unit period on a time axis. The unit period is a period of time (for example, 0.1 seconds) that is sufficiently shorter than the duration of one note of the musical piece.

Figure 3:
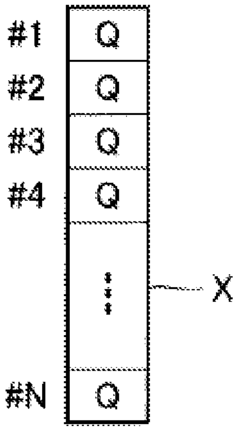
FIG. 3 is a schematic diagram of input data.

FIG. 3 is a schematic diagram of one unit of input data X. The input data X are N-dimensional vectors composed of N elements Q corresponding to different pitches (#1, #2 . . . , #N). The number N of the elements Q is a natural number of 2 or more (for example, N=128). Of the N elements Q of the input data X corresponding to each unit period, the element Q corresponding to the pitch that the user is playing in this unit period is set to 1, and the element Q corresponding to the pitch that the user is not playing in the unit period is set to 0. In a unit period in which a plurality of pitches are played in parallel, of the N elements Q, a plurality of elements Q that respectively correspond to the plurality of pitches being played are set to 1. Of the N elements Q, the element Q corresponding to the pitch that the user is playing can be set to 0, and the element Q corresponding to the pitch that the user is not playing can be set to 1.

The output data generation module 24 of FIG. 2 generates a time series of output data Z from the time series of the input data X. The output data Z are generated for each unit period. That is, from input data X of each unit period, output data Z of the unit period is generated.

The output data Z are used for controlling the sustained effect of the performance sound. Specifically, the output data Z are binary data representing whether or not to add the sustained effect to the performance sound. For example, the output data Z are set to 1 when the sustained effect is to be added to the performance sound, and set to 0 when the sustained effect is not to be added.

The effect control module 25 controls the drive mechanism 122 in the pedal mechanism 12 in accordance with the time series of the output data Z. Specifically, if the numerical value of the output data Z is 1, the effect control module 25 controls the drive mechanism 122 to drive the sustain pedal 121 in the operated state (that is, the depressed state). On the other hand, if the numerical value of the output data Z is 0, the effect control module 25 controls the drive mechanism 122 to release the drive the sustain pedal 121. For example, the effect control module 25 instructs the drive mechanism 122 to operate the sustain pedal 121 when the numerical value of the output data Z changes from 0 to 1, and instructs the drive mechanism 122 to release the sustain pedal 121 when the numerical value of the output data Z changes from 1 to 0. The drive mechanism 122 is instructed to drive the sustain pedal 121 by a MIDI control change, for example. As can be understood from the description above, the output data Z of the first embodiment can also be expressed as data representing the operation/release of the sustain pedal 121.

Whether to operate the sustain pedal 121 in the performance of the keyboard instrument generally tends to be determined in accordance with the time series of pitches performed with the keyboard instrument (that is, the content of the musical score of the musical piece). For example, the sustain pedal 121 can tend to be temporarily released immediately after a low note is played. Further, when a melody is played within a low frequency range, the sustain pedal 121 can tend to be operated/released in quick, short steps. The sustain pedal 121 can also tend to be released when the chord being played is changed. In consideration of the tendencies described above, an estimation model M that has learned the relationship between operation/release of the sustain pedal 121 and the time series of the pitches that are played can be used for the generation of the output data Z by the output data generation module 24.

Figure 4:
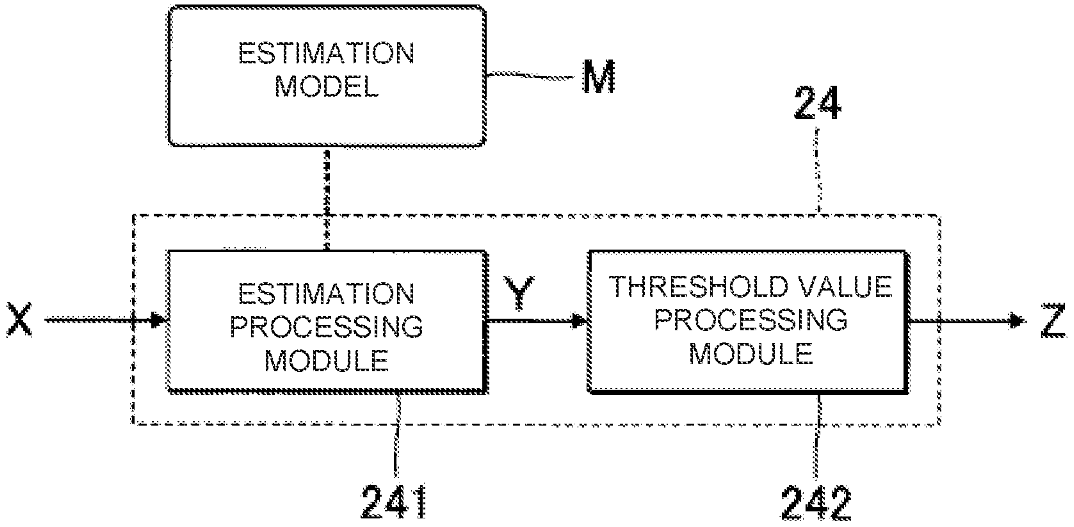
FIG. 4 is a block diagram illustrating a configuration of an output data generation module.

FIG. 4 is a block diagram illustrating a configuration of the output data generation module 24. The output data generation module 24 includes an estimation processing module 241 and a threshold value processing module 242. The estimation processing module 241 generates a time series of a provisional value Y from the time series of the input data X using the estimation model M. The estimation model M is a statistical estimation model that outputs the provisional value Y using the input data X as input. The provisional value Y is an index representing the degree of the sustaining effect to be added to the performance sound. The provisional value Y is also expressed as an index representing the degree to which the sustain pedal 121 should be operated (that is, the amount of depression). The provisional value Y is set to a numerical value within a range of 0 or more and 1 or less ($0 \leq Y \leq 1$), for example.

The threshold value processing module 242 compares the provisional value Y and a threshold value Yth, in order to generate the output data Z corresponding to the result of said comparison. The threshold value Yth is set to a prescribed value within a range of greater than 0 and less than 1 ($0 < Yth < 1$). Specifically, if the provisional value Y exceeds the threshold value Yth, the threshold value processing module 242 sets the numerical value of the output data Z to 1. On the other hand, if the provisional value Y is below the threshold value Yth, the threshold value processing module 242 sets the numerical value of the output data Z to 0. As can be understood from the foregoing explanation, the output data generation module 24 inputs the time series of the input data X into the estimation model M, and generates the time series of the output data Z.

Figure 5:
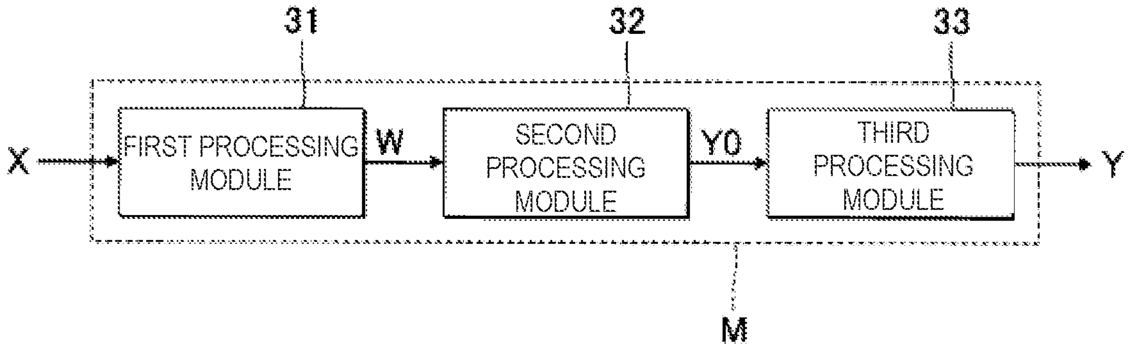
FIG. 5 is a block diagram illustrating a specific configuration of an estimation model.

FIG. 5 is a block diagram illustrating a specific configuration of the estimation model M. The estimation model M includes a first processing module 31, a second processing module 32, and a third processing module 33. The first processing module 31 generates K-dimensional (K is a natural number greater than or equal to 2) intermediate data W from the input data X. The first processing module 31 is a recurrent neural network, for example. Specifically, the first processing module 31 includes long short-term memory (LSTM) including K hidden units. The first processing module 31 can include a plurality of sequentially connected long short-term memory units.

The second processing module 32 is a fully connected layer that compresses the K-dimensional intermediate data W into a one-dimensional provisional value Y0. The third processing module 33 converts the provisional value Y0 into the provisional value Y within a prescribed range ($0 \leq Y \leq 1$). Various conversion functions, such as the sigmoid function, are used in the process with which the third processing module 33 converts the provisional value Y0 into the provisional value Y.

The estimation model M illustrated above is realized by a combination of a program that causes the electronic controller 13 to execute a calculation for generating the provisional value Y from the input data X, and a plurality of coefficients (specifically, a weighted value and a bias) that are applied to said calculation. The program and the plurality of coefficients are stored in the storage device 14.

Figure 6:
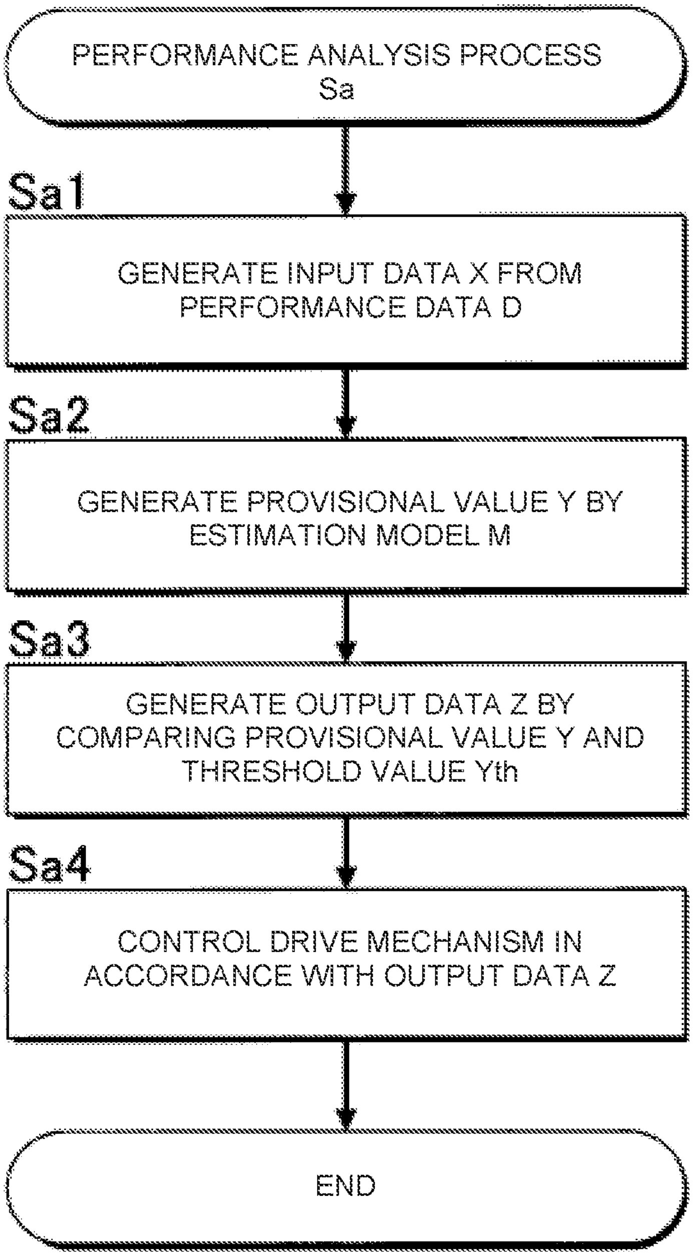
FIG. 6 is a flowchart illustrating a specific procedure of a performance analysis process.

FIG. 6 is a flowchart illustrating the specific procedure of a process (hereinafter referred to as "performance analysis process") Sa, in which the electronic controller 13 analyzes the user's performance. The performance analysis process Sa is executed for each unit period. Further, the performance analysis process Sa is executed in real time, in parallel with the user's performance of the musical piece. That is, the performance analysis process Sa is executed in parallel with the generation of the performance data D by the performance processing module 21 and the generation of the audio signal V by the sound generator module 22. The performance analysis process Sa is one example of the "performance analysis method."

The input data acquisition module 23 generates the input data X from the performance data D (Sa1). The output data generation module 24 generates the output data Z from the input data X (Sa2 and Sa3). Specifically, the output data generation module 24 (estimation processing module 241) uses the estimation model M to generate the provisional value Y from the input data X (Sa2). The output data generation module 24 (threshold value processing module 242) generates the output data Z corresponding to the result of comparing the provisional value Y and the threshold value Yth (Sa3). The effect control module 25 controls the drive mechanism 122 in accordance with the output data Z (Sa4).

As described above, in the first embodiment, the time series of the input data X representing the pitches played by the user is input to the estimation model M, in order thereby to generate the time series of the output data Z for controlling the sustain effect in the performance sound of the pitch represented by the input data X. Therefore, it is possible to generate the output data Z that can appropriately control the sustained effect of the performance sound, without requiring music data that define the timings of operation/release of the sustain pedal 121.

Figure 7:
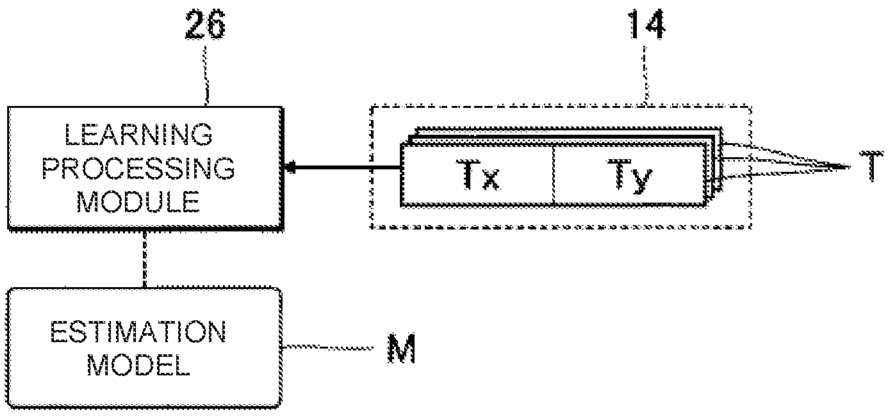
FIG. 7 is an explanatory diagram of machine learning of a learning processing module.

The learning processing module 26 in FIG. 2 constructs the above-mentioned estimation model M by machine learning. FIG. 7 is an explanatory diagram of machine learning of the learning processing module 26. The learning processing module 26 sets each of the plurality of coefficients of the estimation model M by machine learning. A plurality of items of training data T are used for the machine learning of the estimation model M.

Each of the plurality of items of training data T are known data, in which training input data Tx and training output data Ty are associated with each other. The training input data Tx are N-dimensional vectors representing one or more pitches by N elements Q corresponding to different pitches, in the same manner as the input data X illustrated in FIG. 3. The training output data Ty are binary data representing whether or not to add the sustaining effect to the performance sound, in the same manner as the output data Z. Specifically, the training output data Ty in each training data T represent whether or not to add the sustained effect to the performance sound of the pitch represented by the training input data Tx of said training data T.

Figure 8:
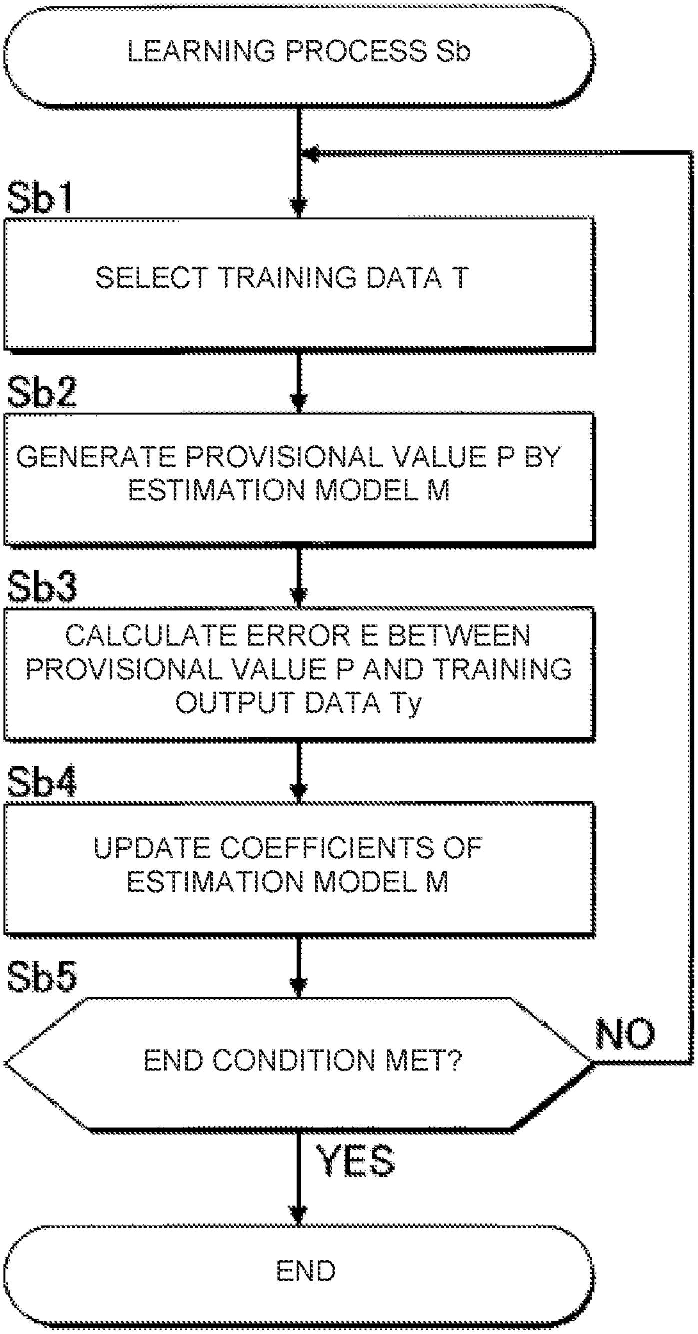
FIG. 8 is a flowchart illustrating a specific procedure of a learning process.

The learning processing module 26 constructs the estimation model M by supervised machine learning that uses the plurality of items of training data T described above. FIG. 8 is a flowchart illustrating the specific procedure of a process (hereinafter referred to as "learning process") Sb with which the learning processing module 26 constructs the estimation model M. For example, the learning process Sb is triggered by an instruction from the user to the operating device 15.

The learning processing module 26 selects one of a plurality of items of training data T (hereinafter referred to as "selected training data T") (Sb1). The learning processing module 26 inputs the training input data Tx of the selected training data T into the provisional estimation model M in order to generate a provisional value P (Sb2). The learning processing module 26 calculates an error E between the provisional value P and the numerical value of the training output data Ty of the selected training data T (Sb3). The learning processing module 26 updates the plurality of coefficients of the estimation model M so as to decrease the error E (Sb4). The learning processing module 26 repeats the process described above until a prescribed end condition is met (Sb5: NO). Examples of the end condition include the error E falling below a prescribed threshold value, and a prescribed number of items of training data T being used to update the plurality of coefficients of the estimation model M. When the end condition is met (Sb5: YES), the learning processing module 26 ends the learning process Sb.

As can be understood from the foregoing explanation, the estimation model M learns the latent relationship between the training input data Tx and the training output data Ty in the plurality of items of training data T. That is, after machine learning by the learning processing module 26, the estimation model M outputs a statistically valid provisional model Y for the unknown input data X subject to the relevant relationship. As can be understood from the foregoing explanation, the estimation model M is a learned model that has learned the relationship between the training input data Tx and the training output data Ty.

B: Second Embodiment

The second embodiment will be described. In each of the configurations illustrated below, elements that have the same functions as in the first embodiment have been assigned the same reference symbols as those used to describe the first embodiment and the detailed descriptions thereof have been omitted, as deemed appropriate.

Figure 9:
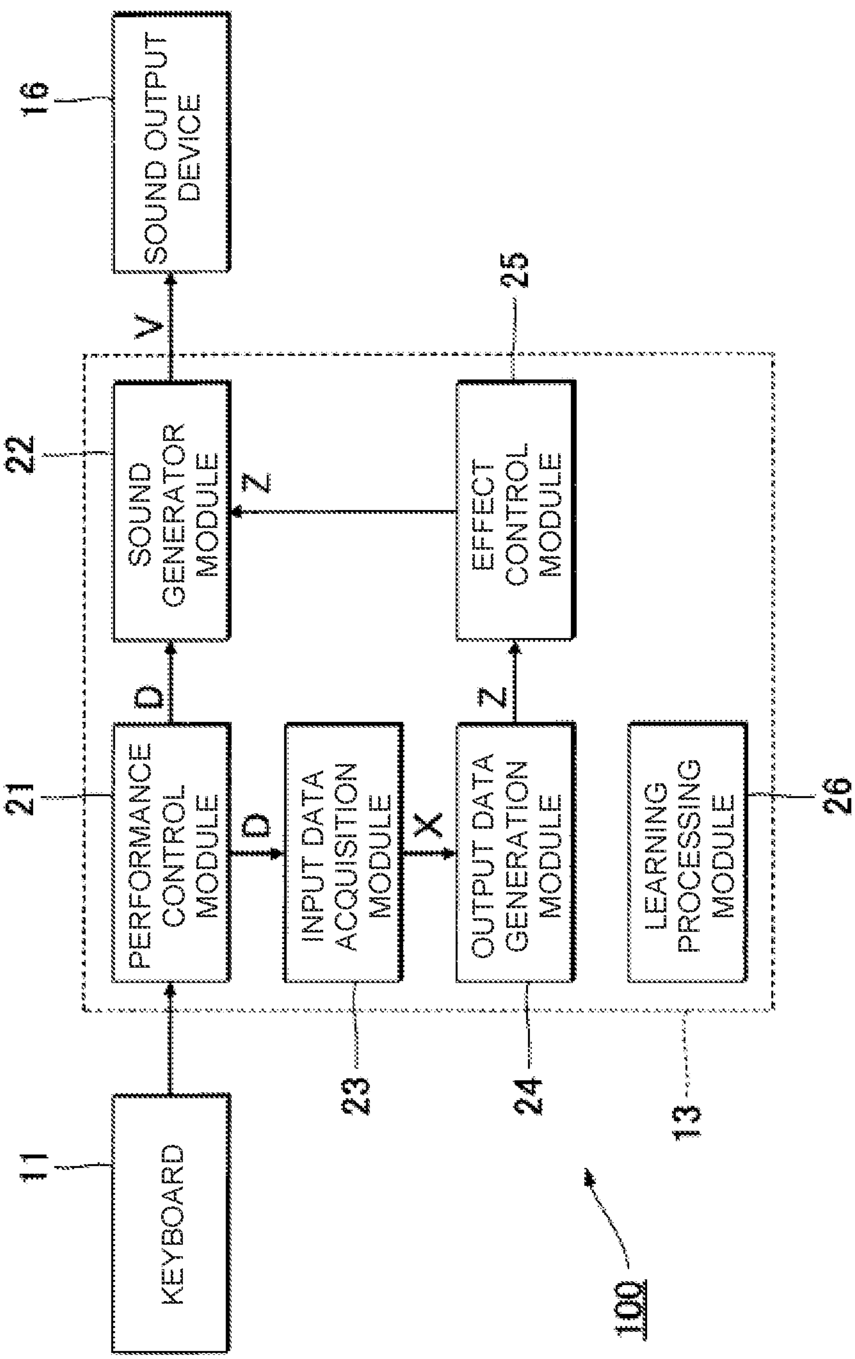
FIG. 9 is a block diagram illustrating a configuration of a performance system according to a second embodiment.

FIG. 9 is a block diagram illustrating the functional configuration of the performance system 100 according to the second embodiment. As described above, the effect control module 25 of the first embodiment controls the drive mechanism 122 in accordance with the time series of the output data Z. The effect control module 25 of the second embodiment controls the sound generator module 22 in accordance with the time series of the output data Z. The output data Z of the second embodiment are binary data representing whether or not to add the sustained effect to the performance sound, in the same manner as in the first embodiment.

The sound generator module 22 is able to switch between whether to add or not add the sustained effect to the performance sound represented by the audio signal V. If the output data Z indicate adding the sustain effect, the effect control module 25 controls the sound generator module 22 such that the sustained effect is added to the performance sound. On the other hand, if the output data Z indicate not to add the sustained effect to the performance sound, the effect control module 25 controls the sound generator module 22 such that the sustained effect is not added to the performance sound. In the second embodiment, in the same manner as in the first embodiment, it is possible to generate a performance sound to which is added an appropriate sustained effect with respect to the time series of the pitches played by the user. Further, by the second embodiment, it is possible to generate a performance sound to which the sustained effect is appropriately added, even in a configuration in which the performance system 100 does not include the pedal mechanism 12.

C: Third Embodiment

Figure 10:
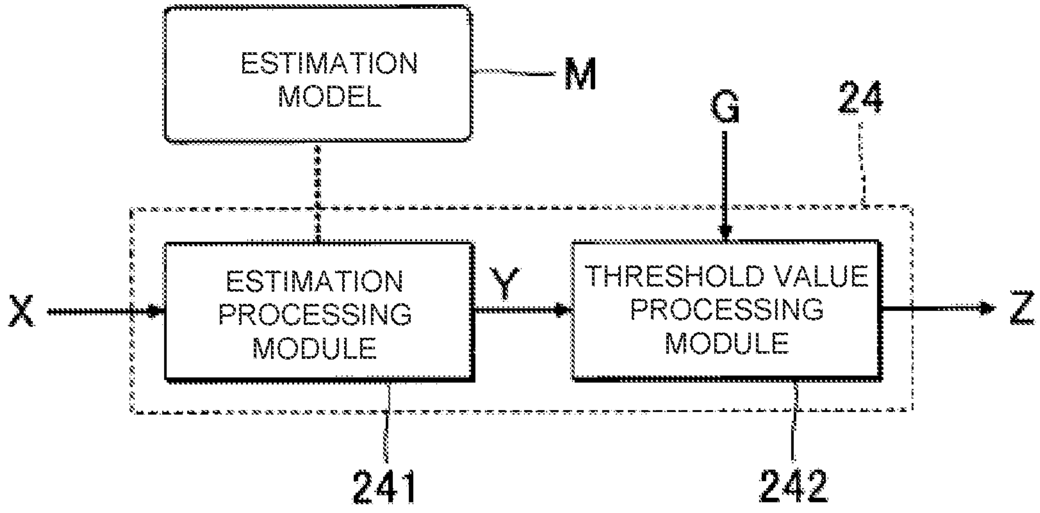
FIG. 10 is a block diagram illustrating a configuration of an output data generation module according to a third embodiment.

FIG. 10 is a block diagram illustrating the configuration of the output data generation module 24 according to a third embodiment. The output data generation module 24 of the third embodiment is instructed regarding a music genre G of a musical piece played by the user. For example, the threshold value processing module 242 is instructed regarding a music genre G specified by the user by an operation on the operating device 15. The music genre G is a classification system that categorizes musical pieces into music classes (types). Typical examples of the music genres G are, among others, musical classifications such as rock, pop, jazz, dance, and blues. The frequency with which the sustained effect is added tends to differ for each music genre G.

The output data generation module 24 (specifically, the threshold value processing module 242) controls the threshold value Yth in accordance with the music genre G. That is, the threshold value Yth in the third embodiment is a variable value. For example, if the instructed music genre G is one in which the sustained effect tends to be applied frequently, the threshold value processing module 242 sets the threshold value Yth to a smaller value than when the music genre G for which an instruction is provided is one in which the sustained effect tends to be applied infrequently. The probability that the provisional value Y will exceed the threshold value Yth increases as the threshold value Yth decreases. Therefore, the frequency with which the output data Z indicating the addition of the sustained effect is generated also increases.

The same effects that are realized in the first embodiment are realized in the third embodiment. Further, in the third embodiment, because the threshold value Yth is controlled in accordance with the music genre G of the musical piece played by the user, an appropriate sustained effect corresponding to the music genre G of the musical piece can be added to the performance sound.

D: Fourth Embodiment

Figure 11:
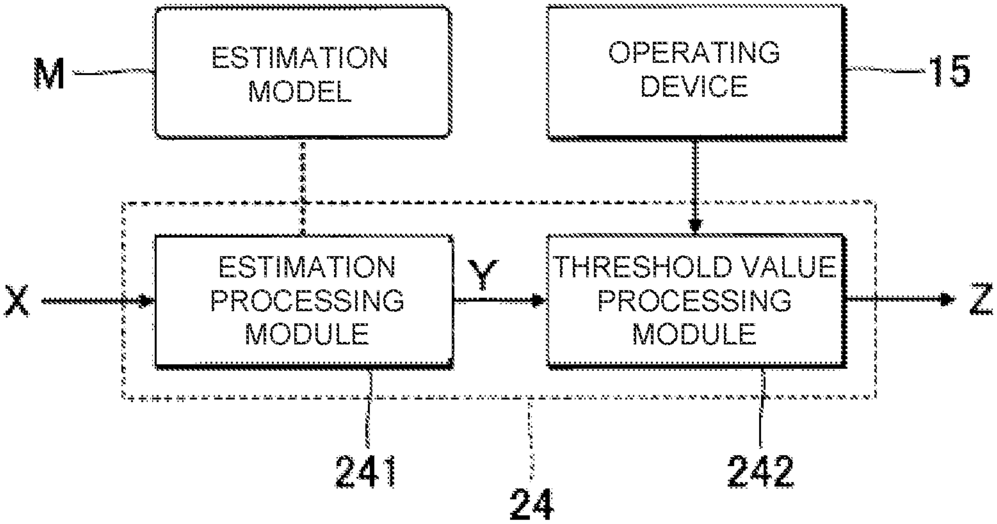
FIG. 11 is a block diagram illustrating a configuration of an output data generation module according to a fourth embodiment.

FIG. 11 is a block diagram illustrating the configuration of the output data generation module 24 according to a fourth embodiment. The user can operate the operating device 15 in order to instruct the output data generation module 24 to change the threshold value Yth. The output data generation module 24 (specifically, the threshold value processing module 242) controls the threshold value Yth in response to an instruction from the user via the operating device 15. For example, a configuration in which the threshold value Yth is set to a numerical value instructed by the user, or a configuration in which the threshold value Yth is changed in response to an instruction, from the user can be assumed. As described above in the third embodiment, the probability that the provisional value Y will exceed the threshold value Yth increases as the threshold value Yth decreases. Therefore, the frequency with which the output data Z indicating the addition of the sustain effect is generated also increases.

The same effects that are realized in the first embodiment are realized in the fourth embodiment. Further, in the fourth embodiment, since the threshold value Yth is controlled in accordance with an instruction from the user, it is possible to add a sustained effect to the performance sound with an appropriate frequency that corresponds to the user's tastes or intentions.

E: Fifth Embodiment

Figure 12:
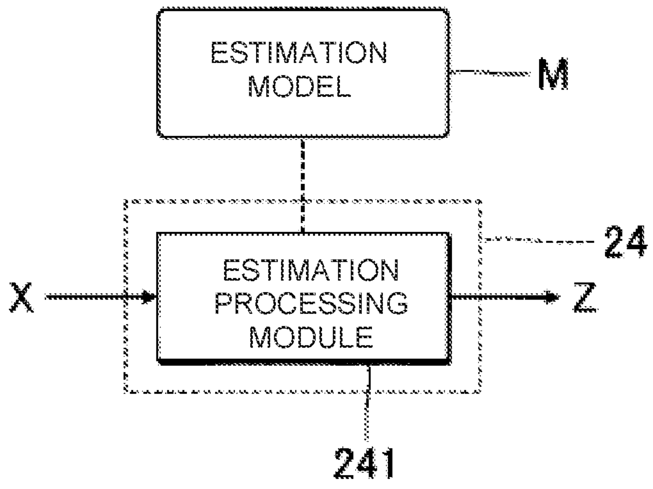
FIG. 12 is a block diagram illustrating a configuration of an output data generation module according to a fifth embodiment.

FIG. 12 is a block diagram illustrating a configuration of the output data generation module 24 according to a fifth embodiment. The threshold value processing module 242 of the first embodiment generates binary output data Z indicating whether or not to add a sustained effect. In contrast to the first embodiment, in the fifth embodiment, the threshold value processing module 242 is omitted. Therefore, the provisional value Y generated by the estimation processing module 241 is output as the output data Z. That is, the output data generation module 24 generates multivalued output data Z which indicate the degree of the sustained effect to be added to the performance sound. The output data Z of the fifth embodiment is also referred to as multivalued data that represent the operation amount (that is, the amount of depression) of the sustain pedal 121.

The effect control module 25 controls the drive mechanism 122 such that the sustain pedal 121 is operated in accordance with the operation amount corresponding to the output data Z. That is, the sustain pedal 121 can be controlled to be in an intermediate state between the fully depressed state and the released state. Specifically, the operation amount of the sustain pedal 121 increases as the numerical value of the output data Z approaches 1, and the operation amount of the sustain pedal 121 decreases as the numerical value of the output data Z approaches 0.

The same effects that are realized in the first embodiment are realized in the fifth embodiment. Further, in the fifth embodiment, since multivalued output data Z indicating the degree of the sustained effect are generated, there is the benefit that the sustained effect to be added to the performance sound can be finely controlled.

In the foregoing description, a configuration in which the effect control module 25 controls the drive mechanism 122 in the same manner as in the first embodiment was used as an example. However, the configuration of the fifth embodiment for generating multivalued output data Z indicating the degree of the sustained effect can be similarly applied to the second embodiment in which the effect control module 25 controls the sound generator module 22. Specifically, the effect control module 25 controls the sound generator module 22 such that the sustained effect to the degree indicated by the output data Z is added to the performance sound. Further, the configuration of the fifth embodiment for generating multivalued output data Z indicating the degree of the sustain effect can be similarly applied to the third and fourth embodiments.

F. Modified Examples

Specific modifications to be added to each of the foregoing embodiments used as examples are illustrated below. Two or more embodiments arbitrarily selected from the following examples can be appropriately combined insofar as they are not mutually contradictory.

(1) In each of the foregoing embodiments, output data Z for controlling the sustained effect are illustrated, but the type of the acoustic effect controlled by the output data Z is not limited to the sustained effect. For example, the output data generation module 24 can generate output data Z for controlling an effect that changes the tone (hereinafter referred to as "tone change") of the performance sound. That is, the output data Z represent the presence/absence or the degree of the tone change. Examples of such changes in tone include various effect processes, such as an equalizer process for adjusting the signal level of each band of the performance sound, a distortion process for distorting the waveform of the performance sound, and a compressor process for suppressing the signal level of a section in which the signal level is high in the performance sound. The waveform of the performance sound also changes in the sustained effect illustrated in the above-mentioned embodiments. Therefore, the sustained effect is also one example of tone change.

(2) In each of the above-mentioned embodiments, the input data acquisition module 23 generate the input data X from the performance data D, but the input data acquisition module 23 can receive the input data X from an external device. That is, the input data acquisition module 23 is comprehensively expressed as an element that acquires the time series of the input data X representing the pitches that are played, and encompasses both an element that itself generates the input data X, and an element that receives the input data X from an external device.

(3) In each of the above-mentioned embodiments, the performance data D generated by the performance processing module 21 are supplied to the input data acquisition module 23, but the input to the input data acquisition module 23 is not limited to the performance data D. For example, a waveform signal representing the waveform of the performance sound can be supplied to the input data acquisition module 23. Specifically, a configuration in which a waveform signal is input to the input data acquisition module 23 from a sound collecting device that collects performance sounds that are emitted from a natural musical instrument, or a configuration in which a waveform signal is supplied to the input data acquisition module 23 from an electric musical instrument, such as an electric string instrument, can be assumed. The input data acquisition module 23 estimates one or more pitches played by the user for each unit period by analyzing the waveform signal in order to generate the input data X representing the one or more pitches.

(4) In each of the above-mentioned embodiments, a configuration in which the sound generator module 22 or the drive mechanism 122 is controlled in accordance with the output data Z is illustrated, but the method of utilizing the output data Z is not limited to the examples described above. For example, the user can be notified of the presence/absence or the degree of the sustained effect represented by the output data Z. For example, a configuration for displaying an image on a display device in which the output data Z represents the presence/absence or the degree of the sustain effect, or a configuration in which voice representing the presence/absence or the degree of the sustain effect is emitted from the sound output device 16, can be assumed. Further, the time series of the output data Z can be stored in a storage medium (for example, the storage device 14) as additional data relating to the musical piece.

(5) In each of the above-described embodiments, a keyboard instrument-type performance system 100 was used as an example, but the specific form of the electronic instrument is not limited to this example. For example, a similar configuration as the above-described embodiments can be applied to various forms of electronic instruments, such as an electric string instrument or an electronic wind instrument, which output performance data D corresponding to the user's performance.

(6) In each of the embodiments described above, the performance analysis process Sa is executed in parallel with the performance of the musical piece by the user, but performance data D that represent the pitch of each note constituting the musical piece can be prepared before executing the performance analysis process Sa. The performance data D is generated in advance by the user's performance of a musical piece or editing work, for example. The input data acquisition module 23 generates the time series of the input data X from the pitch of each note represented by the performance data D, and the output data generation module 24 generates the time series of the output data Z from the time series of the input data X.

(7) In each of the above-described embodiments, the performance system 100 including the sound generator module 22 is illustrated as an example, but the present disclosure can also be specified as a performance analysis device that generates the output data Z from the input data X. The performance analysis device includes at least the input data acquisition module 23 and the output data generation module 24. The performance analysis device can be equipped with the effect control module 25. The performance system 100 used as an example in the embodiments above is also referred to as a performance analysis device equipped with the performance processing module 21 and the sound generator module 22.

(8) In each of the foregoing embodiments, the performance system 100 including the learning processing module 26 is illustrated as an example, but the learning processing module 26 can be omitted from the performance system 100. For example, the estimation model M constructed by an estimation model construction device equipped with the learning processing module 26 can be transferred to the performance system 100 and used for the generation of the output data Z by the performance system 100. The estimation model construction device is also referred to as a machine learning device that constructs the estimation model M by machine learning.

(9) In each of the embodiments above, the estimation model M is constructed by a recursive neural network, but the specific configuration of the estimation model M is arbitrary. For example, besides a recursive type of neural network, the estimation model M can be constructed from a deep neural network, such as a convolutional neural network. Further, various statistical estimation models, such as a Hidden Markov Model (HMM) or a support vector machine can be used as the estimation model M.

(10) The functions of the performance system 100 can also be realized by a processing server device that communicates with a terminal device such as a mobile phone or a smartphone. For example, the processing server device generates the output data Z from the performance data D received from the terminal device, and transmits the output data Z to the terminal device. That is, the processing server device includes the input data acquisition module 23 and the output data generation module 24. The terminal device controls the drive mechanism 122 or the sound generator module 22 in accordance with the output data Z received from the processing server device.

(11) As described above, the functions of the performance system 100 used as an example above are realized by cooperation between one or a plurality of processors that constitute the electronic controller 13, and a program stored in the storage device 14. The program according to the present disclosure can be provided in a form stored in a computer-readable storage medium and installed on a computer. The storage medium is, for example, a non-transitory storage medium, a good example of which is an optical storage medium (optical disc) such as a CD-ROM, but can include storage media of any known form, such as a semiconductor storage medium or a magnetic storage medium. Non-transitory storage media include any storage medium that excludes transitory propagating signals and does not exclude volatile storage media. Further, in a configuration in which a distribution device distributes the program via a communication network, a storage device that stores the program in the distribution device corresponds to the non-transitory storage medium.

(12) The means for executing the program for realizing the estimation model M is not limited to a CPU. A dedicated neural network processor, such as a Tensor Processing Unit or a Neural Engine, or a DSP (Digital Signal Processor) dedicated to artificial intelligence can execute the program for realizing the estimation model M. Further, a plurality of types of processors selected from the examples described above can be used in collaborative fashion to execute the program.

G: Additional Statement

The following configurations, for example, can be understood from the foregoing embodiment examples.

The performance analysis method according to one aspect (aspect 1) of the present disclosure comprises acquiring a time series of input data representing a pitch that is played, and inputting the acquired time series of input data into an estimation model that has learned the relationship between training input data representing pitch and training output data representing an acoustic effect to be added to a sound having the pitch, thereby generating a time series of output data for controlling the acoustic effect of a sound having the pitch represented by the acquired time series of input data. In the aspect described above, the time series of input data representing the pitch that is played is input to the estimation model in order to generate the time series of output data for controlling the acoustic effect of the sound (hereinafter referred to as "performance sound") having the pitch represented by the input data. Therefore, it is possible to generate the time series of the output data that can appropriately control the sustained effect in the performance sound, without requiring music data that define the acoustic effect.

In a specific example (aspect 2) of aspect 1, the acoustic effect is a sustained effect for sustaining a sound having a pitch represented by the time series of input data. By the aspect described above, it is possible to generate the time series of the output data that can appropriately control the sustained effect in the performance sound. The sustained effect is an acoustic effect that sustains a performance sound.

In a specific example (aspect 3) of aspect 2, the output data represents whether to add the sustain effect. By the aspect described above, it is possible to generate the time series of the output data that can appropriately control whether to add or not to add the sustained effect to the performance sound. A typical example of output data that represent whether to add or not to add the sustained effect is data representing the depression (on)/release (off) of the sustain pedal of the keyboard instrument.

In a specific example (aspect 4) of aspect 2, the output data represent the degree of the sustained effect. By the aspect described above, it is possible to generate the time series of the output data that can appropriately control the degree of the sustained effect in the performance sound. A typical example of output data that represent the degree of the sustained effect is data representing the degree of the operation of the sustain pedal of a keyboard instrument (for example, data specifying one of a plurality of stages of the amount of depression of the sustain pedal).

The performance analysis method according to a specific example (aspect 5) of any one of aspects 2 to 4 further comprises controlling a drive mechanism for driving the sustain pedal of the keyboard instrument in accordance with the time series of output data. By the aspect described above, it is possible to appropriately drive the sustain pedal of the keyboard instrument with respect to the performance sound.

The performance analysis method according to a specific example (aspect 6) of any one of aspects 2 to 4 further comprises controlling a sound generator unit that generates a sound having the pitch that is played in accordance with the time series of output data. In the aspect described above, it is possible to appropriately add the sustained effect to a performance sound generated by the sound generator unit. The "sound generator unit" is a function that is realized by a general-purpose processor, such as a CPU, executing a sound generator program, or a function for generating sound in a dedicated sound processing processor.

In a specific example (aspect 7) of any one of aspects 1 to 6, the acoustic effect is an effect for changing the tone of a sound having a pitch represented by the time series of input data. In the aspect described above, since output data for controlling changes in tone are generated, there is the advantage that a performance sound with an appropriate tone can be generated with respect to the pitch that is played.

In a specific example (aspect 8) of any one of aspects 1 to 7, the estimation model outputs a provisional value in accordance with the degree to which the acoustic effect should be added to the input of each input data, and in the generation of the time series of output data, the output data are generated in accordance with the result of comparing the provisional value and a threshold value. In the aspect described above, because the output data are generated in accordance with the result of comparing the threshold value and the provisional value in accordance with the degree to which the acoustic effect should be added, it is possible to appropriately control whether to add the acoustic effect with respect to the pitch of the performance sound.

The performance analysis method according to a specific example (aspect 9) of aspect 8 further comprises controlling the threshold value in accordance with a music genre of the musical piece that is played. In the aspect described above, since the threshold value is controlled in accordance with the music genre of the musical piece that is played, the acoustic effect can be appropriately added on the basis of the tendency for the frequency with which the acoustic effect is added to differ in accordance with the music genre of the musical piece.

The performance analysis method according to a specific example (aspect 10) of aspect 8 further comprises controlling the threshold value in accordance with an instruction from the user. In the aspect described above, since the threshold value is controlled in accordance with an instruction from the user, the acoustic effect can be appropriately added to the performance sound in accordance with the user's taste or intention.

A performance analysis device according to one aspect of the present disclose executes the performance analysis method according to any one of the plurality of aspects indicated as examples above.

Further, a program according to one aspect of the present disclosure controls the computer execution of the performance analysis method according to any one of the plurality of aspects indicated as examples above. For example, a non-transitory computer-readable medium storing a program causes a computer to function as a plurality of modules. The modules comprises an input data acquisition module that acquires a time series of input data representing a played pitch that is played, and an output data generation module that inputs the acquired time series of input data into an estimation model that has learned a relationship between training input data representing pitch and training output data representing an acoustic effect to be added to a sound having the pitch, and generates a time series of output data for controlling an acoustic effect to be added to a sound having the played pitch represented by the acquired time series of input data.

What is claimed is:

1. A performance analysis method realized by a computer, the performance analysis method comprising:

acquiring a time series of input data that are pitch data representing pitches and that are generated from performance data which are musical instrument digital interface data representing a performance by a user on an electronic instrument; and inputting the time series of input data into an estimation model, thereby generating a time series of output data for controlling an acoustic effect to be added to sound having the pitches, the estimation model being a model that is trained by the computer, or trained and transferred from an estimation model construction device, and that has learned a relationship between a plurality of items of training input data representing training pitches and a plurality of items of training output data representing a training acoustic effect to be added to training sound having the training pitches.

2. The performance analysis method according to claim 1, wherein the acoustic effect is a sustained effect for sustaining the sound having the pitches.

3. The performance analysis method according to claim 2, wherein the time series of output data represent whether or not to add the sustained effect.

4. The performance analysis method according to claim 2, wherein the time series of output data represent a degree of the sustained effect.

5. The performance analysis method according to claim 2, further comprising controlling, in accordance with the time series of output data, a drive mechanism configured to drive a sustain pedal of a keyboard instrument as the electronic instrument.

6. The performance analysis method according to claim 2, further comprising controlling, in accordance with the time series of output data, a sound generator module configured to generate the sound having the pitches.

7. The performance analysis method according to claim 1, wherein the acoustic effect is an effect for changing a tone of the sound having the pitches.

8. The performance analysis method according to claim 1, wherein the estimation model is configured to output a provisional value in accordance with a degree to which the acoustic effect is added to input of each item of the time series of input data, and in the generating of the time series of output data, the provisional value is compared with a threshold value, and the time series of output data are generated in accordance with a result of the comparing.

9. The performance analysis method according to claim 8, further comprising controlling the threshold value in accordance with a music genre of a musical piece that is performed by the user on the electronic instrument.

10. The performance analysis method according to claim 8, further comprising receiving an instruction representing the threshold value via input of the user, and controlling the threshold value to be set in accordance with the instruction.

11. A performance analysis device comprising:

an electronic controller including at least one processor, the electronic controller being configured to execute a plurality of modules including an input data acquisition module that acquires a time series of input data that are pitch data representing pitches and that are generated from performance data representing a performance by a user on an electronic instrument, and an output data generation module that inputs the time series of input data into an estimation model, thereby generating a time series of output data for controlling an acoustic effect to be added to sound having the pitches the estimation model being a model that is trained by the electronic controller, or trained and transferred from an estimation model construction device, and that has learned a relationship between a plurality of items of training input data representing training pitches and a plurality of items of training output data representing a training acoustic effect to be added to training sound having the training pitches.

12. The performance analysis device according to claim 11, wherein the acoustic effect is a sustained effect for sustaining the sound having the pitches.

13. The performance analysis device according to claim 12, wherein the time series of output data represent whether or not to add the sustained effect.

14. The performance analysis device according to claim 12, wherein the time series of output data represent a degree of the sustained effect.

15. The performance analysis device according to claim 12, wherein the electronic controller is further configured to execute an effect control module that controls, in accordance with the time series of output data, a drive mechanism configured to drive a sustain pedal of a keyboard instrument as the electronic instrument.

16. The performance analysis device according to claim 12, wherein the electronic controller is further configured to execute an effect control module that controls, in accordance with the time series of output data, a sound generator module configured to generate the sound having the pitches.

17. The performance analysis device according to claim 11, wherein the acoustic effect is an effect for changing a tone of the sound having the pitches.

18. The performance analysis device according to claim 11, wherein the estimation model is configured to output a provisional value in accordance with a degree to which the acoustic effect is added to input of each item of the time series of input data, and the output data generation module compares the provisional value with a threshold value and generates the output data in accordance with a result of comparing the provisional value with the threshold value.

19. The performance analysis device according to claim 18, wherein the output data generation module controls the threshold value in accordance with a music genre of a musical piece that is performed by the user on the electronic instrument.

20. The performance analysis device according to claim 18, further comprising a user operable input that is operable by the user, wherein the output data generation module receives an instruction representing the threshold value via an input of the user to the user operable input, and controls the threshold value to be set in accordance with the instruction.

* * * * *